US009716460B2

(12) United States Patent
Nondahl et al.

(10) Patent No.: US 9,716,460 B2
(45) Date of Patent: Jul. 25, 2017

(54) METHOD AND APPARATUS FOR SPEED REVERSAL CONTROL OF MOTOR DRIVE

(71) Applicants: Thomas Nondahl, Greenfield, WI (US); Jingbo Liu, Grafton, WI (US); Semyon Royak, Beachwood, OH (US); Peter B. Schmidt, Franklin, WI (US); Jingya Dai, Kitchener (CA); Ehsan Al-nabi, Cambridge (CA)

(72) Inventors: Thomas Nondahl, Greenfield, WI (US); Jingbo Liu, Grafton, WI (US); Semyon Royak, Beachwood, OH (US); Peter B. Schmidt, Franklin, WI (US); Jingya Dai, Kitchener (CA); Ehsan Al-nabi, Cambridge (CA)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 14/607,505

(22) Filed: Jan. 28, 2015

(65) Prior Publication Data
US 2016/0218657 A1 Jul. 28, 2016

(51) Int. Cl.
| H02P 27/08 | (2006.01) |
| H02P 6/08 | (2016.01) |
| H02P 6/20 | (2016.01) |
| H02P 6/21 | (2016.01) |
| H02M 7/00 | (2006.01) |
| H02P 6/30 | (2016.01) |

(Continued)

(52) U.S. Cl.
CPC ............. *H02P 27/08* (2013.01); *H02M 7/00* (2013.01); *H02P 6/08* (2013.01); *H02P 6/21* (2016.02); *H02P 6/30* (2016.02); H02M 7/48 (2013.01)

(58) Field of Classification Search
USPC ........................................... 318/254
See application file for complete search history.

(56) References Cited

U.S. PATENT DOCUMENTS 3,723,840 A 3/1973 Opal et al.
4,823,251 A 4/1989 Kawabata et al.
(Continued)

FOREIGN PATENT DOCUMENTS

CN 101383585 A 3/2009
CN 102045021 A 5/2011
(Continued)

OTHER PUBLICATIONS

Ancuti et al. (Ancuti, R.; Boldea, I.; Andreescu, G.-D.,"Sensorless V/f control of high-speed surface permanent magnet synchronous motor drives with two novel stabilising loops for fast dynamics and robustness," Electric Power Applications, IET , vol. 4, No. 3, pp. 149,157, Mar. 2010).*

(Continued)

*Primary Examiner* — Eduardo Colon Santana
*Assistant Examiner* — Said Bouziane
(74) *Attorney, Agent, or Firm* — Fay Sharpe LLP

(57) ABSTRACT

Motor drive control apparatus and methods are presented for speed reversal control for drives used with output filters and transformers using a high or maximal drive current command to facilitate dissipation of regenerative energy seen in this system during speed reversal with open loop control to reverse the spin direction of a driven motor while quickly transitioning through zero speed.

18 Claims, 8 Drawing Sheets

(51) Int. Cl.
*H02P 1/04* (2006.01)
*H02M 7/48* (2007.01)

(56) References Cited

U.S. PATENT DOCUMENTS

| | | | |
|---|---|---|---|
| 5,032,771 | A | 7/1991 | Kerkman |
| 5,526,252 | A | 6/1996 | Erdman |
| 5,703,449 | A | 12/1997 | Nagate |
| 5,717,305 | A | 2/1998 | Seibel |
| 5,744,921 | A | 4/1998 | Makaran |
| 5,909,098 | A | 6/1999 | Konecny et al. |
| 5,959,431 | A | 9/1999 | Xiang |
| 5,994,869 | A | 11/1999 | Bacerra |
| 6,121,736 | A | 9/2000 | Narazaki et al. |
| 6,124,697 | A | 9/2000 | Wilkerson |
| 6,208,537 | B1 | 3/2001 | Skibinski et al. |
| 6,222,335 | B1 | 4/2001 | Hiti et al. |
| 6,329,781 | B1 | 12/2001 | Matsui et al. |
| 6,600,980 | B1 * | 7/2003 | Kraska ............ B60K 6/445 477/2 |
| 6,940,249 | B2 | 9/2005 | Toyoda |
| 6,965,212 | B1 | 11/2005 | Wang et al. |
| 7,045,988 | B2 | 5/2006 | Ha et al. |
| 7,049,778 | B2 | 5/2006 | Katanaya |
| 7,084,604 | B2 | 8/2006 | Salomaki |
| 7,102,323 | B2 | 9/2006 | Zhou et al. |
| 7,468,595 | B2 | 12/2008 | Lee |
| 7,679,308 | B2 | 3/2010 | Tomigashi |
| 7,724,549 | B2 | 5/2010 | Skibinski et al. |
| 7,729,146 | B2 | 6/2010 | Hayami et al. |
| 7,932,693 | B2 | 4/2011 | Lee |
| 7,979,223 | B2 | 7/2011 | Monti et al. |
| 7,990,097 | B2 | 8/2011 | Cheng et al. |
| 8,009,450 | B2 | 8/2011 | Royak et al. |
| 8,143,838 | B2 | 3/2012 | Akiyama |
| 8,217,602 | B2 | 7/2012 | Ikei |
| 8,232,760 | B2 | 7/2012 | Lu et al. |
| 8,288,886 | B2 | 10/2012 | Anwar et al. |
| 8,299,646 | B2 | 10/2012 | Rockenfeller et al. |
| 8,350,507 | B2 | 1/2013 | Ito |
| 8,384,321 | B2 * | 2/2013 | Jeong ............. H02P 21/34 318/400.01 |
| 8,541,971 | B2 | 9/2013 | Sakai |
| 8,736,220 | B2 | 5/2014 | Ogawa et al. |
| 8,890,450 | B2 | 11/2014 | Maekawa |
| 8,970,154 | B2 | 3/2015 | Ishikawa et al. |
| 8,981,702 | B2 | 3/2015 | Katariya et al. |
| 2004/0052097 | A1 | 3/2004 | Morimoto |
| 2007/0001635 | A1 | 1/2007 | Ho |
| 2007/0007929 | A1 | 1/2007 | Lee et al. |
| 2008/0001571 | A1 | 1/2008 | Tomigashi |
| 2008/0074074 | A1 * | 3/2008 | Skibinski ........ H02M 7/003 318/800 |
| 2008/0312855 | A1 | 12/2008 | Monti et al. |
| 2009/0146592 | A1 | 6/2009 | Tobari et al. |
| 2009/0153083 | A1 | 6/2009 | Rozman |
| 2009/0200980 | A1 * | 8/2009 | Ramu .............. H02P 25/092 318/701 |
| 2011/0062908 | A1 * | 3/2011 | Kitanaka ......... H02P 21/22 318/400.22 |
| 2011/0084638 | A1 | 4/2011 | Patel et al. |
| 2011/0109155 | A1 | 5/2011 | Anwar et al. |
| 2011/0181232 | A1 | 7/2011 | Krishnamoorthy et al. |
| 2012/0038300 | A1 | 2/2012 | Kato et al. |
| 2012/0100009 | A1 * | 4/2012 | Fujishima ........ H02P 1/04 417/44.1 |
| 2012/0268056 | A1 | 10/2012 | Liu |
| 2013/0153180 | A1 * | 6/2013 | Montocchio ...... B60K 11/04 165/121 |
| 2014/0197774 | A1 | 7/2014 | Liu et al. |
| 2014/0244082 | A1 * | 8/2014 | Caron ............. B60L 11/005 701/22 |
| 2014/0312811 | A1 | 10/2014 | Liu et al. |
| 2015/0002059 | A1 | 1/2015 | Liu et al. |
| 2015/0002067 | A1 | 1/2015 | Rowan et al. |

FOREIGN PATENT DOCUMENTS

| | | |
|---|---|---|
| CN | 102349230 A | 2/2012 |
| CN | 202872721 U | 4/2013 |
| CN | 103190068 A | 7/2013 |
| EP | 1635448 A1 | 3/2006 |
| GB | 2390766 A | 1/2004 |
| JP | 2001-025282 | 1/2001 |
| JP | 2002034289 A | 1/2002 |
| WO | WO2009093214 A2 | 7/2009 |

OTHER PUBLICATIONS

Miranda et al., "Parameter and Speed Estimation for Implementing Low Speed Sensorless PMSM Drive System Based on an Algebraic Method"; Applied Power Electronics Conf.; APEC 2007, $22^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Carpaneto, et al., "A New Sensorless Permanent Magnet Synchronous Motor Algorithm Based on Algebraic Method"; $13^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

Kim et al., "PWM Switching Frequency Signal Injection Sensorless Methos in IPMSM", IEEE, 2011, pp. 3021-3028.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet Nov. 26-Feb. 14, 1 pg.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kobayashi et al., "Investigation of IPMSM's Position Estimation in Low Speed Region with DC Link Current Detection", IEEE Jan. 2007, pp. 1411-1416.

"Guidelines for the Use of 400-600 Volt AC Drives in Medium Voltage Applications," Yaskawa Application Note, Jun. 7, 2005.

Agarlita, Sorin-Cristian et al., "I-f Starting and Active Flux Based Sensorless Vector Control of Reluctance Synchronous Motors, with Experiments", $12^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE $13^{th}$ Int'l Conf. on Optimization of Electrical and Electronic Equipment (OPTIM), May 2012, pp. 432-438.

Batzel, Todd D. et al., *"Electric Propulsion With Sensorless Permanent Magnet Synchronous Motor: Implementation and Performance"*, IEEE Transactions on Energy Conversion, vol. 20, No. 3, pp. 575-583, Sep. 2005.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

(56) References Cited

OTHER PUBLICATIONS

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.
J. Liu et al., "Rotor Position Estimation for Synchronous Machines Based on Equivalent EMF", IEEE Transactions on Industry Applications, vol. 47, pp. 1310-1318, May-Jun. 2011.
Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.
Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.
Kojima, Mari et al., "*Novel Vector Control System Using Deadbeat-Controlled PWM Inverter With Output LC Filter*", IEEE Transacitons on Industry Applications, vol. 40, No. 1, pp. 162-169, Jan./Feb. 2004.
Kukrer, "Deadbeat Control of a Three-Phase Inverter with an Output LC Filter", IEEE Transactions on Power Electronics, vol. 11, No. 1, Jan. 1996, 8 pgs.
Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.
Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.
Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.
Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.
Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.
Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.
Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.
Park et al., "Design and Control of High-Speed Solid-Rotor Synchronous Reluctance Drive With Three-Phase LC Filter", Conference Record of the 2005 IEEE Industry Applications Conf. $40^{th}$ IAS Annual Meeting, vol. 1, Oct. 2, 2005, pp. 715-722.
Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.
Ryvkin, S. et al., "Sensorless Oil Drowned Pump Drive", IEEE ISIE 2005, Jun. 20-23, 2005, Dubrovnik, Croatia, pp. 963-968.
Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.
Salomäki, J. et al., "*Sensorless Vector Control of PMSM Drives Equipped With Inverter Output Filter*", in Proceedings of the $32^{nd}$ Annual Conference of the IEEE Industrial Electronics Society (IECON 2006), Paris, France, pp. 1059-1064.
Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.
Stirban et al., "Motion-Sensorless Control of BLDC-PM Motor With Offline FEM Information Assisted State Observer"; Optimization of Electrical and Electronic Equipment (OPTIM), 2010 $12^{th}$ International Conference, Ma 22, 2010, pp. 321-328.
Extended European Search Report mailed Jul. 8, 2016 for Application No. EP 16 15 2895.

\* cited by examiner

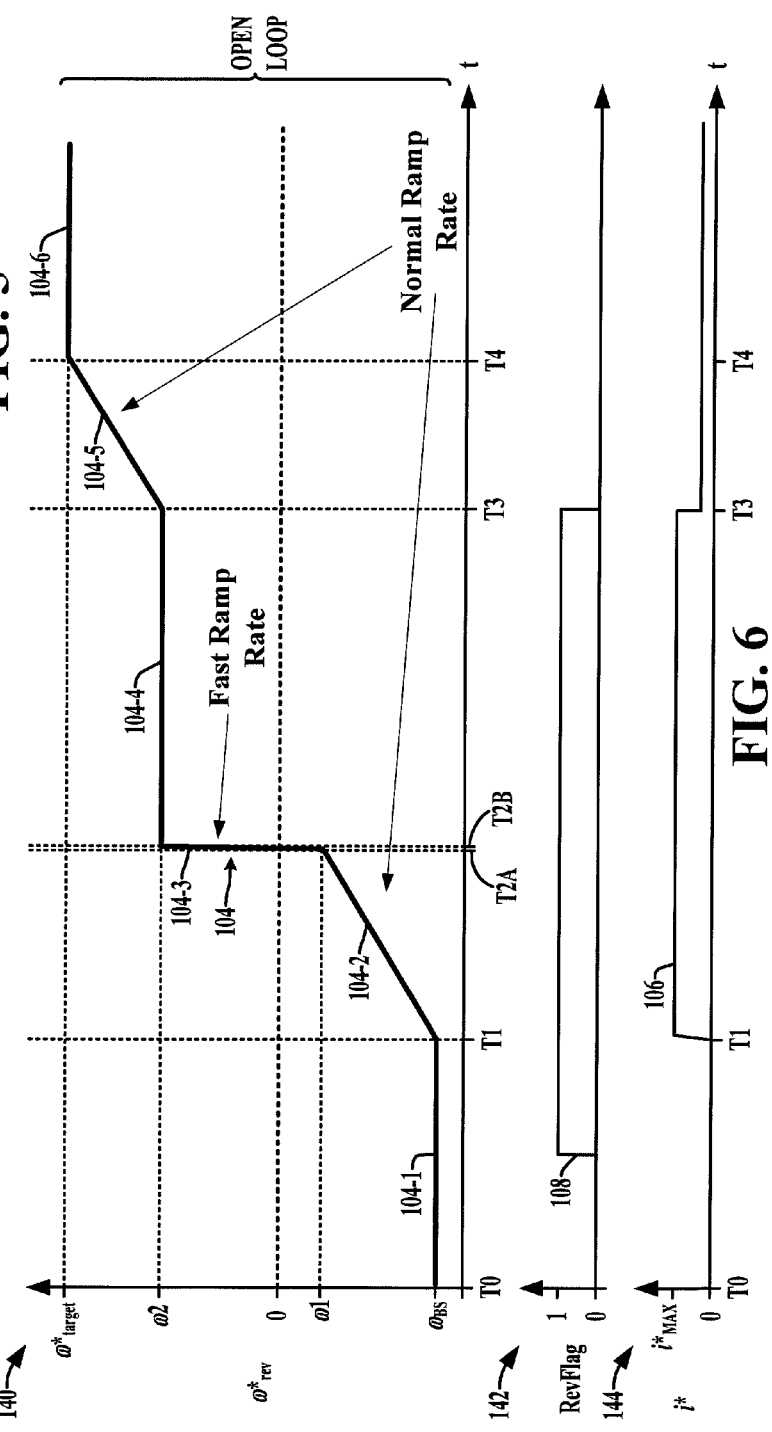
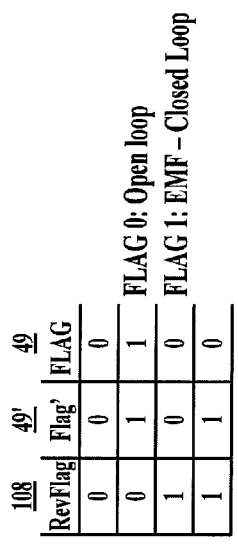
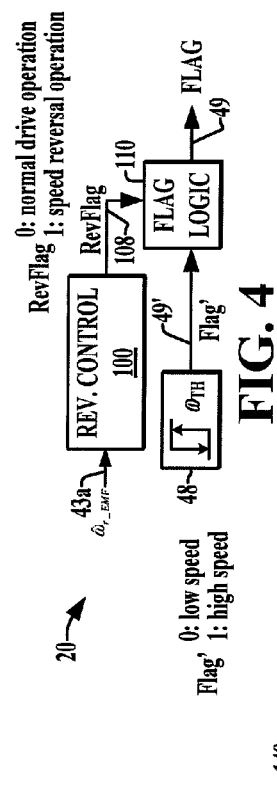

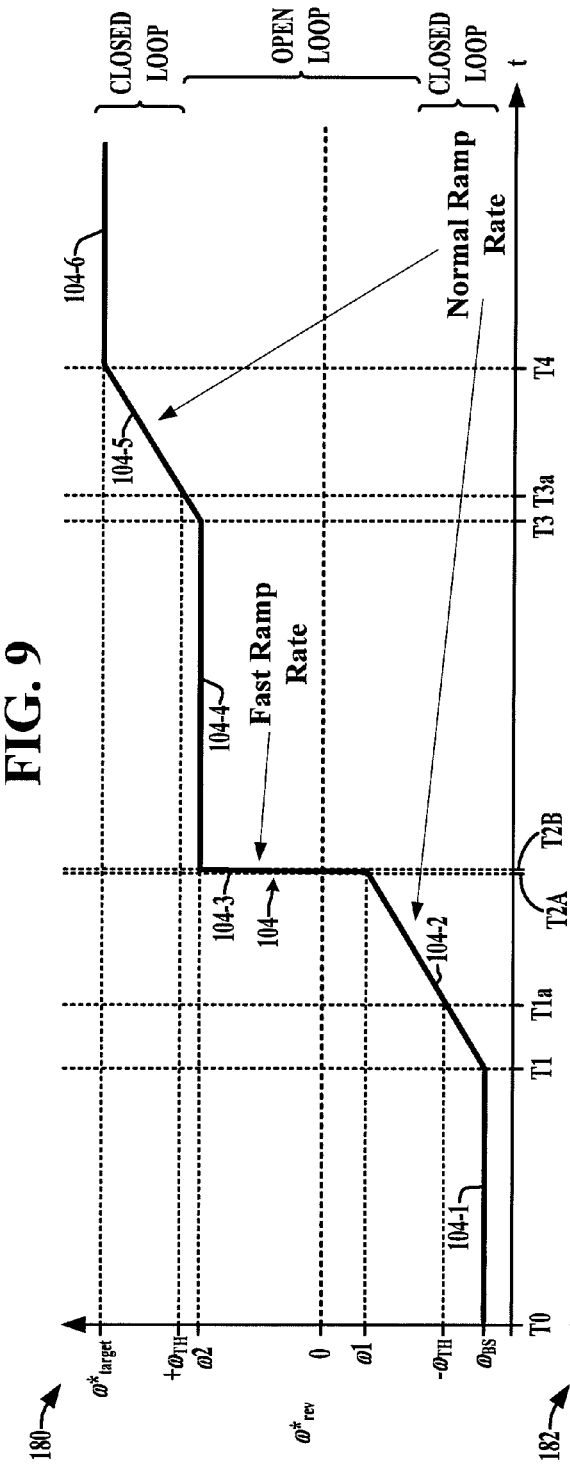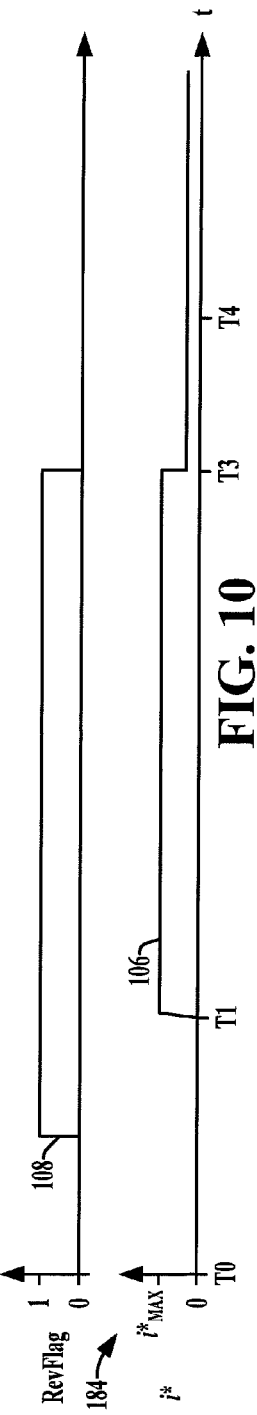
FIG. 9
FIG. 10

METHOD AND APPARATUS FOR SPEED REVERSAL CONTROL OF MOTOR DRIVE

BACKGROUND

Sensorless motor drives are used in a variety of applications, particularly where providing position and/or speed sensors directly at a motor load is difficult or impractical. For example, electric submersible pumps (ESPs) and progressive cavity pumps (PCPs) are used in oil pumps and other applications in which lengthy cables are used to connect the motor drive apparatus to a driven pump motor. In certain applications, a step-up transformer may be used to boost the motor drive output voltage, allowing use of a low-voltage drive to power a medium voltage induction motor, and/or to reduce $I^2R$ losses and facilitate use of a smaller diameter cable wire for long cable runs between the motor drive and the driven motor. Certain applications also employ sine wave filters, such as LC filters or other output filters in order to suppress reflected wave voltage spikes associated with pulse width modulated (PWM) variable frequency drives. In some situations, however, such pump motors may spin in an uncontrollable fashion, typically in a direction opposite to the normal pumping direction due to back flow of fluid. For example, a pump motor may be stopped for some reason while a certain amount of fluid is above the pump within an oil well, and the pressure of the previously pumped fluid rotates the motor in the reverse direction. In these circumstances, it is desirable to restart the motor in the positive pumping direction in an efficient and expeditious manner in order to conserve the pumping work that has already been done by limiting the amount of fluid draining back down the well. However, it is often difficult to resume controlled operation of a motor which is spinning in an uncontrolled fashion, and reversal at low speeds and through zero is difficult due to the intervening transformer between the motor drive and the pump motor. Accordingly, there is need for improved motor drive apparatus and techniques for speed reversal control.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides motor drive control techniques, computer readable mediums and control apparatus for speed reversal control of power conversion systems using output filters and transformers to drive a motor load, in which a high or maximal drive current command is used to facilitate dissipation of regenerative energy seen in this system during speed reversal with open loop velocity control to reverse the spin direction of a driven motor while quickly transitioning through zero speed.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 4 is a schematic diagram;
FIG. 5 is a logic diagram;
FIG. 6 is a graph;
FIG. 9 is a logic diagram;
and
FIG. 10 is a graph.

DETAILED DESCRIPTION

Various embodiments are hereinafter illustrated and described, wherein the disclosure is not limited to the specific examples shown and described. The following disclosures are each hereby Incorporated herein by reference in their entireties: U.S. patent application Ser. No. 13/742,405 for "METHOD AND APPARATUS FOR CONTROLLING POWER CONVERTER WITH INVERTER OUTPUT FILTER" by Liu et al., filed Jan. 16, 2013; U.S. patent application Ser. No. 13/868,216 for "POSITION SENSORLESS OPEN LOOP CONTROL FOR MOTOR DRIVES WITH OUTPUT FILTER AND TRANSFORMER" by Liu et al., filed Apr. 23, 2013; U.S. patent application Ser. No. 13/931,839 for "METHOD AND APPARATUS FOR STABILITY CONTROL OF OPEN LOOP MOTOR DRIVE OPERATION" by Liu et al., filed Jun. 29, 2013; U.S. patent application Ser. No. 14/193,329 for "APPARATUS FOR STABILITY CONTROL OF OPEN LOOP MOTOR DRIVE OPERATION" by Nondahl et al., filed Feb. 28, 2014; U.S. patent application Ser. No. 13/742,405 for "METHOD AND APPARATUS FOR CONTROLLING POWER CONVERTER WITH INVERTER OUTPUT FILTER" by Liu et al., filed Jan. 16, 2013; and U.S. patent application Ser. No. 14/565,781 for "TRANSITION SCHEME FOR POSITION SENSORLESS CONTROL OF AC MOTOR DRIVES" by Nondahl et al., filed Dec. 10, 2014.

Figure 1:
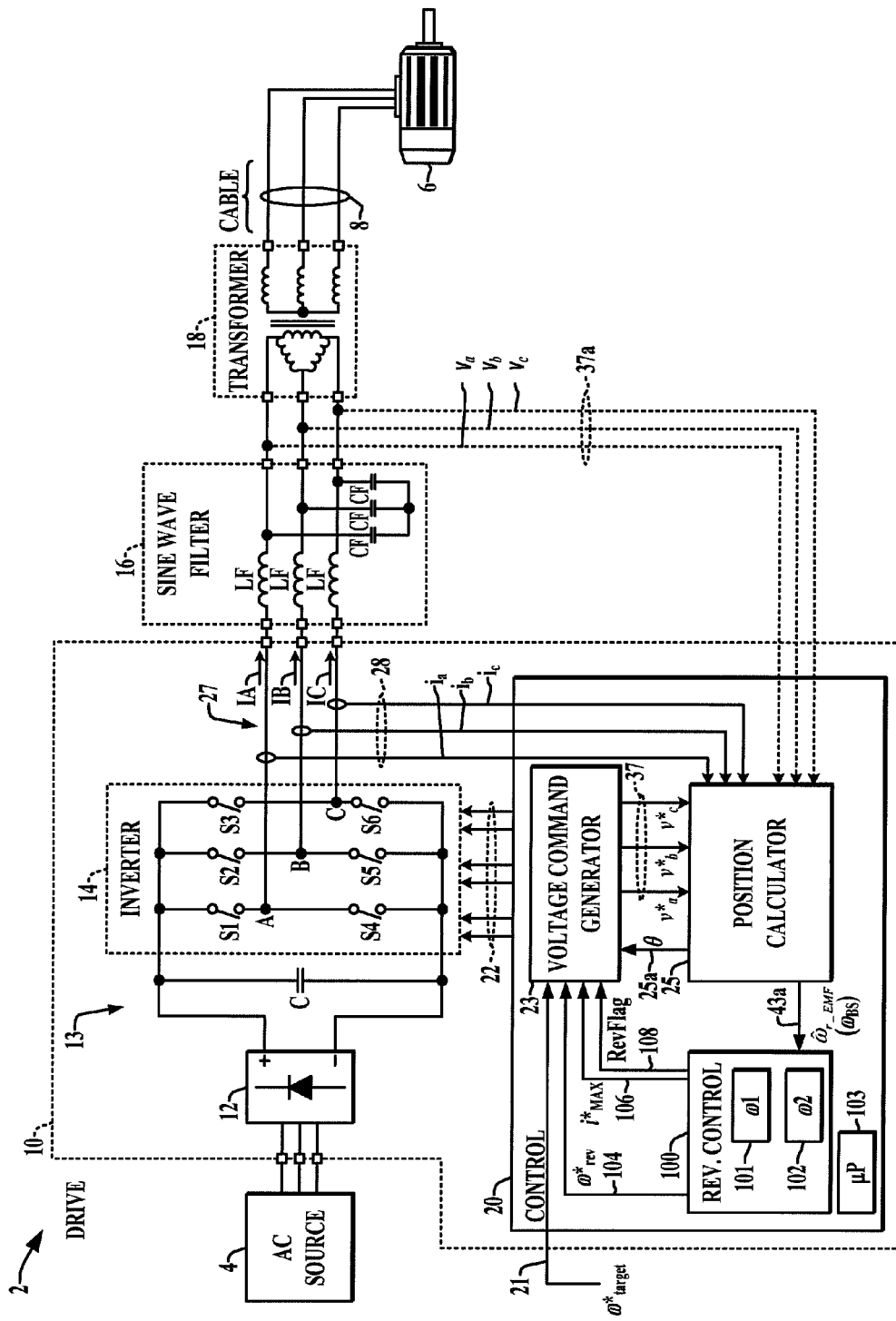
FIG. 1 is a schematic diagram.
Figure 2:
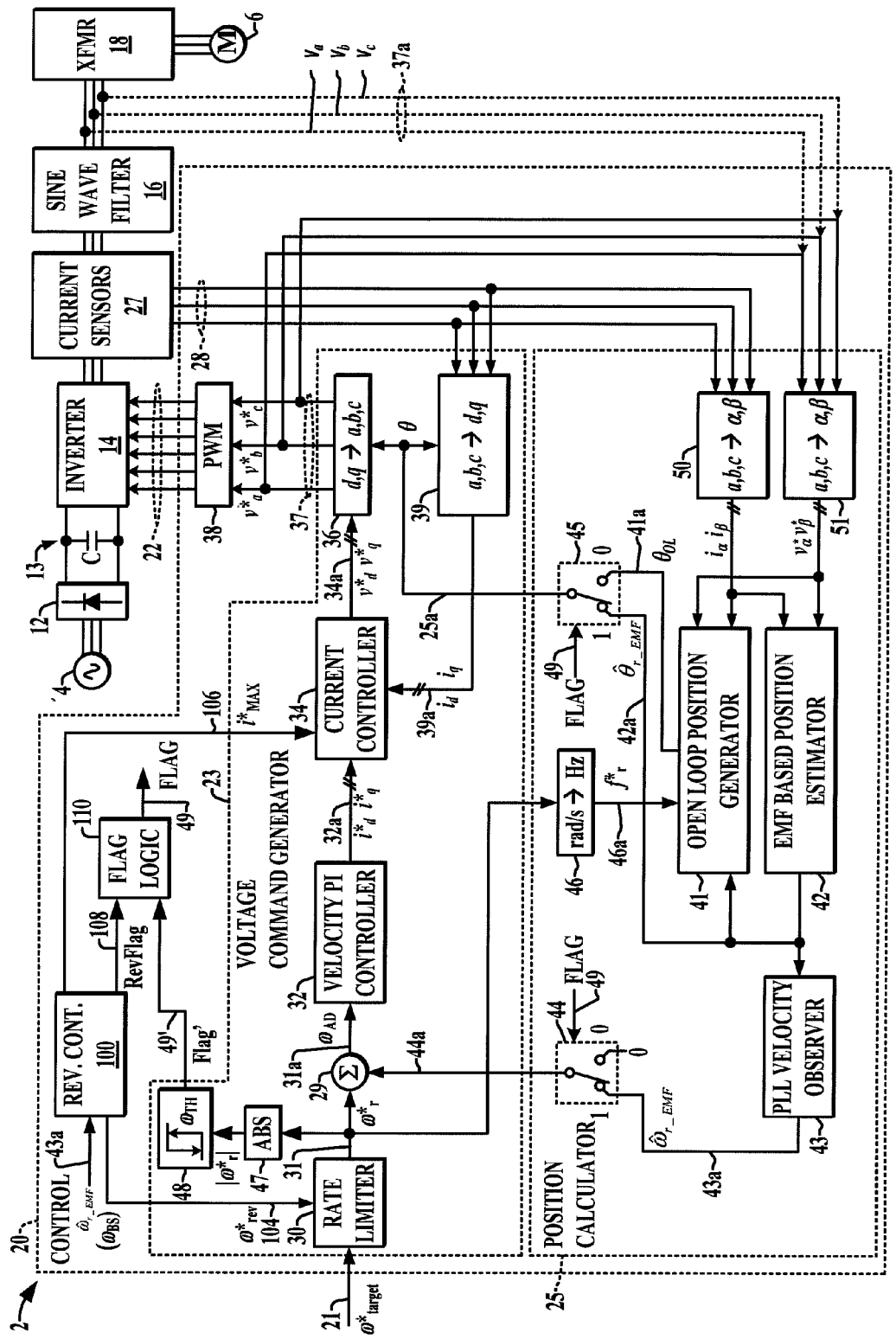
FIG. 2 is a schematic diagram.
Figure 3:
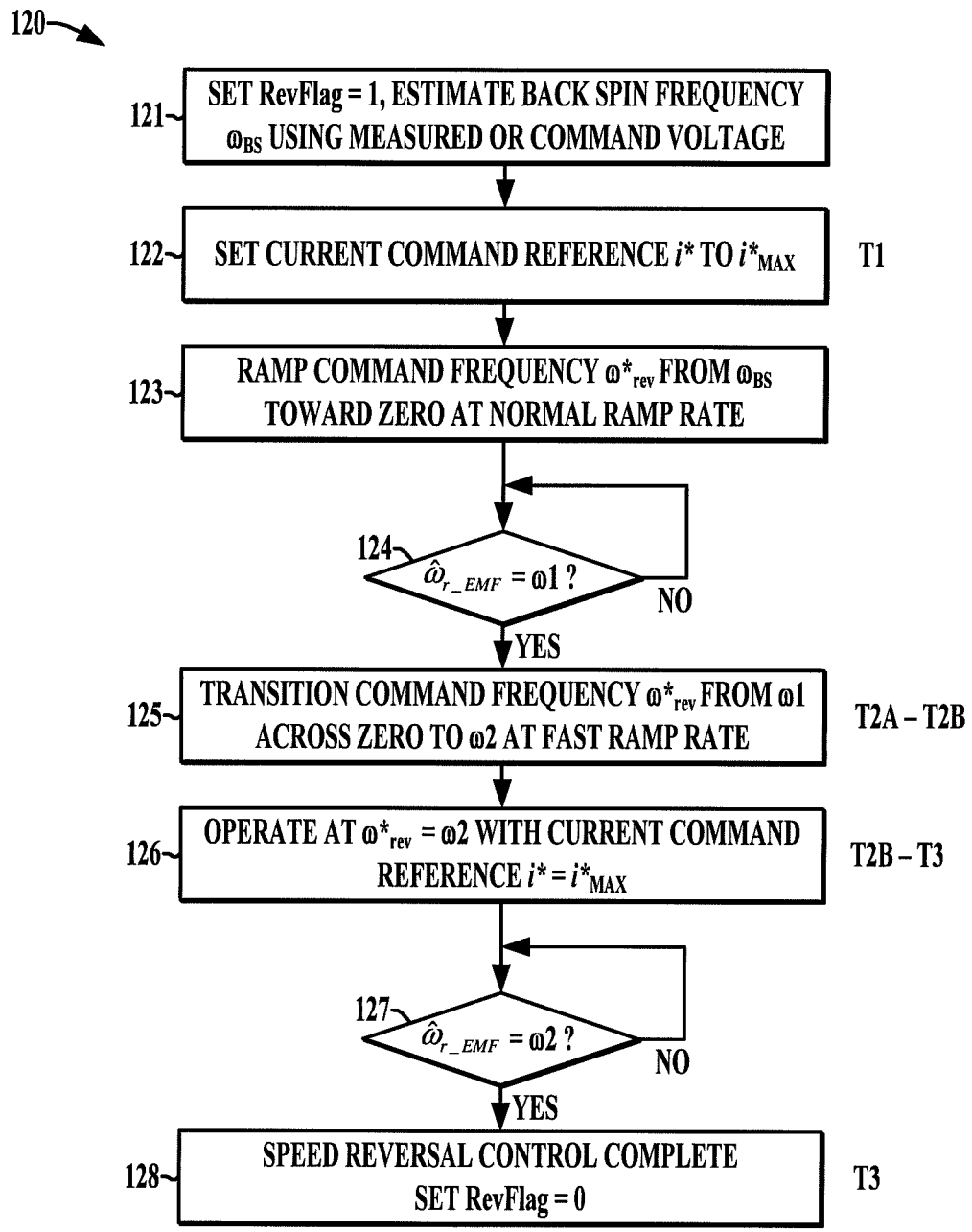
FIG. 3 is a flow diagram.

Referring initially to FIGS. 1-3, FIGS. 1 and 2 illustrate a power conversion system 2 including a motor drive embodiment 10 employing sensorless motor speed control with reversal control components 100 for use with an output filter 16 and a transformer 18 to drive a motor load 6 through a cable 8 by conversion of power received from an AC input source 4. FIG. 3 shows a process embodiment 120 for speed reversal control of a motor drive with an output filter and transformer.

The motor drive 10 of FIGS. 1 and 2 includes a rectifier 12 receiving multiphase input power from the AC source 4 and providing DC output power to an intermediate DC link circuit 13 including a capacitance C. Any suitable form of rectifier 12 can be used, including without limitation a passive rectifier (e.g., one or more rectifier diodes), or a switching rectifier operating at or near the fundamental frequency of the AC input source (fundamental front end or FFE) or at a higher and possibly variable switching frequency, such as an active front end (AFE) rectifier that performs additional functions such as power factor correction, etc.

The DC link circuit 13 provides a DC input voltage to a switching inverter 14, in this case including switching devices S1, S2, S3, S4, S5 and S6 operated according to inverter switching control signals 22 from a controller 20 to convert the DC power to provide the AC output currents IA, IB and IC for directly or indirectly driving the motor load 6 (e.g., through an intervening output or sine wave filter 16 and/or transformer 18). Although the illustrated inverter 14 provides a three-phase two-level output, other single or multiphase or multilevel output implementations are possible within the scope of the present disclosure. Any suitable inverter switching devices S1-S6 may be used, including without limitation insulated gate bipolar transistors (IGBTs), silicon controlled rectifiers (SCRs), gate turn-off thyristors (GTOs), integrated gate commutated thyristors (IGCTs), etc. In the illustrated example, moreover, the motor drive 10 includes current sensors 27 providing inverter output current feedback signals or values 28 ($i_a$, $i_b$ and $i_c$) to the controller 20, which provides switching control signals 22 for operating the inverter switches S1-S6. As further shown in FIG. 1, moreover, certain implementations may include feedback circuitry to provide one or more voltage feedback signals 37a measured at the output of the output filter 16 representing the phase voltages $v_a$, $v_b$ and $v_c$.

The illustrated output filter 16 is a three phase LC filter, although other output filter topologies may be used, such as LCL filters, CLC filters, etc. with one or more series elements and further filter elements (e.g., filter capacitors CF) connected in any suitable configuration, for example, delta or Y. The example of FIG. 1 also includes a transformer 18 between the filter 16 and the motor cable 8. The illustrated transformer 18 has a three phase delta-connected primary as well as a Y-connected secondary, although any suitable transformer primary and/or secondary winding configuration or topology may be used. Moreover, the transformer 18 may in certain embodiments be a step-up transformer. For example, a step-up transformer 18 may facilitate use of a low-voltage drive 10 to power a medium or high voltage motor 6, or allow use of a medium-voltage drive 10 to power a high-voltage motor 6. Also or in combination, a step-up transformer 18 may be useful to allow a reduction in the current levels carried by the cable 8, thereby facilitating use of smaller diameter cable wires in the cable 8. The cable 8, moreover, can be of any suitable construction for interfacing the motor drive output, the sine wave filter 16, and/or the transformer 18 with the leads of the motor 6.

The controller 20 and the elements and components thereof can include suitable logic or processor-based circuitry, and may also include signal level amplification and/or driver circuitry 38 (FIG. 2) to provide suitable drive voltage and/or current levels sufficient to selectively actuate the switching devices S1-S6 based on voltage command from a voltage command generator 23 using commutation position information such as a signal or value 25a from a position calculator component 25. For example, the controller 20 may include comparators, carrier wave generators or digital logic/processor elements and signal drivers, etc. (not shown). The motor drive controller 20 in one embodiment includes at least one processor 103 with an associated electronic memory (not shown), where the processor 103 is configured or otherwise programmed or operable to implement the voltage command generator component 23 for providing a pulse width modulated (PWM) switching control signals 22 to operate the inverter 14 in a normal mode as well as in a reversal control mode described further hereinafter. In addition, the processor 103 in one embodiment implements the position calculator component 25 as well as a reversal control component 100, with the processor implementing and/or storing one or more predetermined jump frequency values 101 and 102 in the associated electronic memory.

In operation, the controller 20 generates pulse width modulated (PWM) inverter switching control signals 22 in order to drive the motor load 6 according to one or more command values which may be computed or otherwise derived using any suitable control algorithms, and may implement an open loop, closed loop or otherwise regulated control strategy to operate the motor load 6 according to one or more desired operating parameters, such as a normal mode target motor speed or frequency $\omega^*_{target}$ which may be provided as an input setpoint signal or value 21 as shown in FIG. 1 or a reversal control frequency $\omega^*_{rev}$ provided by the reversal control component 100.

Open and closed loop control operation can be implemented in any suitable fashion, for example using the apparatus and techniques described hereinafter. Other suitable sensorless open and closed loop control techniques are described, for example, in U.S. patent application Ser. No. 14/565,781 for "TRANSITION SCHEME FOR POSITION SENSORLESS CONTROL OF AC MOTOR DRIVES" by Nondahl et al., filed Dec. 10, 2014 and in U.S. patent application Ser. No. 13/868,216 for "POSITION SENSORLESS OPEN LOOP CONTROL FOR MOTOR DRIVES WITH OUTPUT FILTER AND TRANSFORMER" by Liu et al., filed Apr. 23, 2013, incorporated herein by reference. Moreover, the controller 20 can provide the switching control signals 22 according to any suitable pulse width modulation technique, including without limitation space vector modulation (SVM), carrier-based pulse width modulation, selective harmonic elimination (SHE), etc. In addition, the controller 20 implements various computational functions as detailed hereinafter and may include suitable analog to digital and digital to analog conversion components and processor-based or otherwise programmable logic circuitry alone or in combination with analog circuitry to perform various operations on signals or values as described herein. Furthermore, certain embodiments of the controller 20 may include processing elements and electronic memory for storage of data and computer executable program instructions by which the controller 20 may implement various reversal control methods and functions detailed herein in addition to motor control functions.

Referring also to FIGS. 3-6, the processor 103 in one embodiment is programmed by computer executable instructions stored in a controller memory to implement the reversal control component or object 100 (FIG. 1) using the inverter switching control signals 22 to reverse rotation of the motor 6 from a first direction to an opposite second direction. The reversal operation is shown in the process 120 of FIG. 3, and may be initiated starting from either rotational direction of the motor 6. The reversal processing 120 can be initiated manually, such as via a user interface command provided to the controller 20, or may be initiated automatically based on one or more triggering conditions. For example, the controller 20 can be programmed or otherwise configured to detect reverse spinning of the motor 6 upon startup or after temporary loss of control the operation. In well pumping applications, for instance, loss of motor control and/or temporary shutdown may occur with a significant amount of fluid above the pump, leading to backflow of fluid downward causing reverse spinning of the pump motor 6 in a direction opposite to the normal pumping direction. In response, the controller 20 can initiate operation of the reverse control component 100. Such conditions, moreover, can be detected in any suitable fashion, for example by operation of the position calculator 25 in the illustrated motor determining an operating motor frequency $\hat{\omega}_{r\_EMF}$ 43*a* and the associated rotational direction at least partially according to measured or calculated voltages $v_a$, $v_b$, $v_c$ and/or according to command voltage signals or values $v^*_a$, $v^*_b$, $v^*_c$ calculated for generating the pulse width modulation control signals or values 22.

The controller 20 in one embodiment implements the reverse control component 100 via the processor 103 executing instructions stored in a controller memory according to the process 120 in FIG. 3, including generating the PWM inverter switching control signals 22 to drive the motor 6 at least partially according to a high or maximal drive current level while the motor 6 is rotating in the first direction to facilitate dissipation of regenerative energy in the motor drive 10, and driving the motor 6 using open loop velocity control according to the high or maximal drive current level $i^*_{MAX}$ while transitioning the motor speed through zero to reverse rotation of the motor 6 from the first direction to the second direction. In this regard, the controller 20 uses any suitable elevated drive current level as a current control command signal or value i* during the reversal control process 120, which in certain embodiments is a maximum allowable current of the inverter 14. In other embodiments, a different high or elevated value can be used, which is greater than a presently computed current control command value, but which need not be the maximum capacity of the inverter 14.

This high or maximal drive current level (e.g., $i^*_{MAX}$) is used in certain embodiments throughout the process 120 of FIG. 3, and the controller 20 may also selectively employ open loop and closed loop velocity control during the process 120, with open loop control being used during transitions through zero motor frequency, particularly within a tolerance band defined by first and second jump frequencies 101 ($\omega$1) and 102 ($\omega$2) as described further below. Moreover, the reverse control component 100 advantageously provides for selective ramp rate control for quickly transitioning a motor frequency reversal command signal or value $\omega^*_{rev}$ in passing through zero frequency between the jump frequencies 101 and 102. In this manner, the reversal control processing 120 advantageously employs high or maximal current to facilitate dissipation of regenerative energy seen in the motor drive system 10 during speed reversal, and also accommodates the presence of the output transformer 18 by quickly transitioning through zero motor frequency at a fast ramp rate in combination with open loop control at the zero frequency transitions in order to mitigate lack of control due to saturation effects and lack of DC transference by the transformer 18 at low speeds between the jump frequencies 101 and 102.

The reversal process 120 begins in FIG. 3 with a reverse flag RevFlag (e.g., 108 in FIGS. 1 and 2) being set to a first logic value (e.g., "1" in the illustrated embodiment) to place the controller 20 in the reverse control mode, and the controller 20 estimates or is otherwise provided with a backspin frequency $\omega_{BS}$ at 121. In one possible implementation, the controller 20 determines the backspin frequency $\omega_{BS}$ at 121 at least partially according to measured voltages $v_a$, $v_b$, $v_c$ at the output of the inverter 14 or measured voltages $v_a$, $v_b$, $v_c$ at the output of the output filter 16. In other non-limiting embodiments, the controller 20 determines the backspin frequency $\omega_{BS}$ at 121 at least partially according to command voltage signals or values $v^*_a$, $v^*_b$, $v^*_c$ calculated or otherwise determined via the voltage command generator 23 of the controller 20 in generating the inverter switching control signals 22.

FIG. 4 illustrates a flag logic embodiment in the motor drive embodiment of FIGS. 1 and 2, in which the reversal control component 100 receives the motor frequency estimate $\hat{\omega}_{r\_EMF}$ from the position calculator 25 and provides the reverse flag 108 to a flag logic component 110. The logic 110 further receives a Flag' signal or value 49' from a hysteresis comparator component 48 of the voltage command generator 23 (FIG. 2) determined according to the absolute value of a rate limited target frequency signal or value $\omega^*_r$ based on an external target frequency signal or value $\omega^*_{target}$ (21 in FIGS. 1 and 2 above). The logic component 110 provides a FLAG signal or value 49 used in setting various conditions in the position calculator 25 influencing the control signal generation by the voltage command generator 23 as described further below. In particular, the FLAG signal or value 49 has a first condition (e.g., "0" in the illustrated embodiment) providing for open loop control, and a second state ("1") providing for EMF-based closed loop control operation of the motor drive 10.

FIG. 5 provides a logic diagram 130 showing operation of the flag logic component 110 of FIG. 4 in a first embodiment of the controller 20, which provides for open loop control during the reversal control operations illustrated in the process 120. As further seen in the logic diagram 130 of FIG. 5, moreover, the controller 20 in normal operation (RevFlag=0) selectively implements open loop control for low speeds and implements EMF-based closed loop control for high speeds above a predetermined threshold frequency $\omega_{TH}$ as set by the Flag' signal or value 49'. In other embodiments (e.g., FIGS. 8A-10 below), the FLAG signal or value 49 is generally commensurate with the Flag' signal or value 49' to facilitate selective use of closed and open loop control during reversal control operation as well.

FIG. 6 provides a graph 140 showing a reversal control frequency curve 104 as well as a graph 142 illustrating the reverse flag RevFlag 108 and a current control curve 106 (i*) in graph 144 for speed reversal control as a function of time according to the process 120 of FIG. 3. Beginning at T0 in FIG. 6, the motor 6 is rotating at the backspin frequency $\omega_{BS}$, at which time the controller 20 detects this operation and initiates the reversal process (sets RevFlag=1) between T0 and T1 and sets the current command reference signal or value i* to the high or maximal drive current command signal or value $i^*_{MAX}$ at T1 (122 in FIG. 3).

Continuing at 122 in FIG. 3, while the motor 6 is rotating in the first direction at the backspin frequency $\omega_{BS}$, the controller 20 sets the current command reference signal or value i* used by the voltage command generator 23 to a high or maximal drive current command signal or value (e.g., to $i^*_{MAX}$ 106 as seen in the graph 144 of FIG. 6) and continues generating PWM control signals or values 22 for operating the inverter 14 at the elevated current with the voltage command generator 23 operating according to a motor frequency reversal command signal or value $\omega^*_{rev}$ 104 set by the reversal control component 100 to the backspin frequency value $\omega_{BS}$.

At 123 in FIG. 3, the controller 20 ramps or transitions the motor frequency reversal command signal or value $\omega^*_{rev}$ at a first ramp rate (e.g., a normal ramp rate otherwise used in normal operation of the motor drive 10) from the backspin frequency $\omega_{BS}$ towards zero while generating the inverter switching control signals or values 22 at least partially according to the high or maximal drive current command signal or value $i^*_{MAX}$ and at least partially according to the motor frequency reversal command signal or value $\omega^*_{rev}$. This operation continues as shown at 104-1 in the graph 140 of FIG. 6.

A determination is made by the controller 20 at 124 in FIG. 3 as to whether the sensed or estimated motor frequency $\hat{\omega}_{r\_EMF}$ 43a reaches a first predetermined jump frequency, in this case a predetermined negative jump frequency signal or value ω1 101 corresponding to the present (negative) rotational direction of the motor load 6. This is seen at 104-2 in the graph 140 of FIG. 6, with the controller 20 continuing this frequency ramping toward zero until the motor frequency $\hat{\omega}_{r\_EMF}$ 43a reaches ω1 101 (YES at 124 in FIG. 3).

At 125 and 126 in FIG. 3, in response to a motor frequency $\hat{\omega}_{r\_EMF}$ reaching the negative jump frequency ω1 (at T2A in FIG. 6), the controller 20 quickly transitions the motor frequency reversal command signal or value ω*rev at a second ramp rate from ω1 in the first direction to a second predetermined jump frequency ω2 (102 in FIG. 1) at 125 in the opposite second direction while generating the pulse width modulation control signals or values 22 using open loop control at 126 at least partially according to the high or maximal drive current command signal or value i*$_{MAX}$ and at least partially according to the motor frequency reversal command signal or value ω*$_{rev}$. In this regard, the second ramp rate used to transition through zero frequency from T2A to T2B (curve segment 104-3) in FIG. 6 is preferably much faster than the first ramp rate in order to quickly move through and past regions of limited controllability due to transformer saturation effects and the inability of the transformer 18 to pass DC.

The first and second jump frequencies 101 and 102 may be set to any suitable values, typically relatively small, and are stored in an electronic memory associated with the controller 20 in one embodiment. The values for the jump frequencies in one non-limiting example are from about 1 through about 5 Hz, and these values may, but need not, be the same as one another in all possible embodiments. For example, the first jump frequency ω1 101 in the example of FIG. 6 is approximately 2-3 Hz, where the second jump frequency ω2 102 is approximately 3-5 Hz, although the present disclosure is not limited by these particular examples, and other values can be used in various embodiments. In this regard, the values for the jump frequencies 101 and 102 can advantageously be set to be outside a saturation susceptibility range with regard to operation of the output transformer 18 (FIGS. 1 and 2), and in conjunction with the fast ramping implemented by the reversal control component 100 in transitioning through zero between the jump frequencies advantageously facilitates controlled motor operation despite the limitations of the transformer 18 at such low frequencies. In this regard, the provision of the fast ramping action by the controller 20 in combination with the presetting of the first and second jump frequency values 101 and 102 provides a control window through which operation is passed using high or elevated current settings and open loop control in order to mitigate or avoid loss of control during transitions through zero frequency to reverse the motor 6.

A determination is made by the controller 20 at 127 in FIG. 3 as to whether the actual estimated or measured motor frequency (e.g., $\hat{\omega}_{r\_EMF}$) has reached the second jump frequency ω2 102 in the opposite second direction, and when this condition is satisfied (YES at 127), the controller finishes the speed reversal control operation 120 at 128, setting the RevFlag to 0. This is shown at T3 in FIG. 6, with the controller 20 responding to the externally provided target operating frequency ω*$_{target}$ 21 by generating the PWM control signals or values 22 for operation of the inverter 14 at least partially according to a target drive current command signal or value i* and the target motor frequency command signal or value ω*$_{target}$. As seen in FIG. 6, for example, the target control frequency ω*target may change from the second jump frequency value ω2 102, with the controller 20 responding accordingly, along with selective adjustment of the current command value i* for normal open or closed loop control operation of the motor drive 10 after T3 including any necessary ramping at 104-5 and subsequent steady state operation at 104-6.

FIGS. 8A-10 below illustrate another non-limiting embodiment in which the reversal operations include selective use of EMF-based closed loop control for a first (e.g., high) range of reverse speeds while the motor 6 is rotating in the first direction, with a switch over to open loop operation for a slower range of speeds in the first direction prior to fast transition between the jump frequencies 101 and 102. In the illustrated motor drive system 10, moreover, the reversal control component 100 employs the flag logic 110 to set the FLAG signal or value 49 to facilitate selective (as needed) use of closed loop control processing during the reversal process, and the flag logic 110 also receives the Flag' signal or value 49' from the hysteresis comparison component 48 used in selective employment of closed loop or open loop operation during normal functioning of the motor drive 10. Other logic configurations can be employed in other embodiments for reversal processing, wherein the illustrated logic configuration of the circuits and components 100, 110 and 48 are but one non-limiting example.

Referring again to FIG. 2, example normal mode operation of the motor drive 10 is hereinafter described, including selective use of open loop control concepts for low speeds and closed loop control for higher speeds, in combination with sensorless operation. During this normal operation, the motor drive controller 20 employs sensorless or open loop motor speed control using position command information, such as a signal or value, calculated via an open loop position generator 41 for a first low-speed range of operation and via an EMF-based position estimator 42 for a higher second range of operation, in which a position calculator component 25 of the motor drive controller 20 provides a given commutation position 25a (θ) to a voltage command generator 23 for use in pulse width modulated operation of a motor drive inverter 14. The controller 20 operates in sensorless fashion to control one or more operating parameters of the driven motor load 6. For example, the controller 20 provides the inverter switching control signals 22 in order to control position and/or speed and/or torque of the motor 6 without directly sensing any of these controlled parameters. In the illustrated embodiment, current sensors 27 are disposed at the output of the inverter 14 in FIGS. 1 and 2 to provide feedback signals or values 28 (e.g., $i_a$, $i_b$, and $i_c$) to the controller 20 which represent the inverter output currents IA, IB and IC, and/or from which the values of these output currents can be computed, derived or otherwise estimated.

The controller 20 uses the feedback signals or values 28 as well as one or more desired operating parameters to regulate or adjust the output currents IA, IB and IC. In addition, the controller 20 may reuse voltage command signals or values 37 $v_a^*$, $v_b^*$ and $v_c^*$ generated by the voltage command generator component 23 as inputs for the position calculator component 25, or other embodiments are possible in which voltage signals or values 37a $v_a$, $v_b$ and $v_c$ may be sensed, such as at the output of the sine wave filter 16 as shown in dashed lines in FIG. 2, for use by the position calculator 25. In general, the control technique implemented by the illustrated controller 20 is essentially sensorless or open-loop with respect to the actual operating condition of the driven motor load 6 (e.g., speed and/or position), as there are no direct feedback signals obtained from the motor 6 itself. For instance, the controller 20 receives a desired frequency or motor speed value of $\omega^*_{target}$ 21 (in units of radian per second or, equivalently, $f^*_{target}$ in units of Hz) from a supervisory control system component (not shown) or other external system, which may be a distributed control system (DCS) element, a user-adjustable knob, local user interface, etc. The controller 20, moreover, includes a voltage command generator component 23, which implements a velocity controller 32 as a voltage-frequency or current-frequency control component in certain non-limiting implementations, and which may implement a proportional-integral (PI) or other form of closed-loop control function in certain embodiments.

As shown in FIG. 2, the velocity controller 32 receives an adjusted speed or frequency signal or value 31*a* from an adjustment component (e.g., summation component) 29 and provides current setpoint signals or values 32*a* in a d,q reference frame to a current controller 34, which in turn provides d,q voltage setpoint signals or values 34*a* to a d,q to a,b,c reference frame converter 36. The converter 36 provides voltage signals or values 37 $v_a^*$, $v_b^*$ and $v_c^*$ to a PWM component 38 for generating the inverter control signals 22. In addition, the current feedback is provided from the current sensors 27 to an a,b,c to d,q converter component 39 which provides d and q axis current signals 39*a* to the current controller 34. In this regard, the converters 36 and 39 perform the reference frame conversions according to a given position signal or value 25*a* provided by the commutation position calculator 25 ("$\theta$"). In operation, the control components 32 and 34 are used to regulate the inverter output currents IA, IB and IC by providing the inverter switching control signals 22 according to the desired speed or frequency signal or value 21 and the current feedback signals or values 28.

The controller 20 implements the position calculator component 25, for example, in hardware, processor-executed software, programmable logic, etc., or combinations thereof, where the calculator 25 computes a commutation position signal or value 25*a* based on the desired speed signal or value 21 using an open loop position generator 41 or based on the inverter output current feedback signals or values $i_a$, $i_b$ and $i_c$ as well as on one or more voltage command signals or values 37 $v_a^*$, $v_b^*$ and $v_c^*$ (or measured output voltages sensed at the output of the sine wave filter 16 as shown in FIG. 2) using an EMF-based position estimator component 42. The target speed 21 is provided to a rate limiter 30, which provides a rate limited desired speed signal or value $\omega^*_r$ to the summation component 29 and to an absolute value (ABS) component 47, whose output represents the absolute value of the rate limited desired speed ($|\omega^*_r|$). The output from the absolute value component 47 is provided as an input to a hysteresis component 48 to selectively set or reset a flag 49' (Flag' in the figures), in one example having a value of "0" for a first low speed range of operation and a value of "1" for operation in a higher second range. The use of the hysteresis comparison component 48, in this regard, provides for some level of overlap between the first and second speed ranges, and facilitates operation without unnecessary transitioning back and forth between two operating modes for operation near the boundary of the ranges if separate. Thus, for example, the flag 49' will transition from 0 to 1 when the absolute value exceeds a first threshold, and will transition back from 1 to 0 when the absolute value falls below a second, lower, threshold, wherein the figures illustrate this dual threshold with hysteresis as a single threshold value $\omega_{TH}$ for ease of illustration. In one possible implementation, for example, the flag 49' is set to 1 when the speed exceeds 15% of a rated value, and will be set back to 0 when the absolute value of the speed falls below 14% of the rated value (e.g., $\omega_{TH}$=14.5%), although any suitable first and second ranges and corresponding thresholds (e.g., with or without hysteresis) can be used to operate the controller 20 in a first mode for a first range of speeds or in a second mode for a second higher range of speeds.

The adjustment component 29 (e.g., summer) adjusts the frequency or speed setpoint value 21 based at least partially on a feedback signal or value 44*a* received from the position calculator 25. It is noted in the logic diagram 130 of FIG. 5 that the FLAG signal 49 is the same as the Flag' signal 49' when the RevFlag signal 108 is "0" during normal operation. In the illustrated embodiments, the calculator 25 includes a selection component 44 providing the feedback signal or value 44*a* according to the state of flag signal or value 49 (FLAG in the figures) from the hysteresis component 48 and the flag logic 110 (FIG. 4), in one case to set the feedback signal or value 44*a* to a fixed value (e.g., zero in one example) for open loop control when FLAG 49 is 0 in the first mode for the first range of speeds. The calculator 25 otherwise sets the feedback signal or value 44*a* to an EMF-based speed estimate signal or value 43*a* obtained from a PLL velocity observer 43 according to an EMF-based position estimate 42*a* received from the EMF-based position estimator component 42. In this manner, low-speed operation is facilitated by saturation of the velocity controller 32 by using 0 (or other fixed value) for the velocity feedback, whereby the PI or other close loop control elements of the velocity PI controller 32 will drive the motor 6 through the current controller 34 to facilitate startup or low speed operation, whereupon transition to the second mode (FLAG=1) utilizes the EMF-based speed estimate signal or value $\hat{\omega}_{r\_EMF}$ 43*a* to attain the desired (e.g., rate limited) speed signal or value 31 $\omega^*_r$ for higher speed closed-loop operation in the second mode. In this manner, the controller 20 facilitates control of the operation of the driven motor load 6 at low speeds and/or during startup conditions by selective use of open loop control where the saturation and other local frequency effects of the output transformer 18 are most pronounced.

The EMF-based position estimator component 42 in one embodiment is implemented using concepts set forth in the paper Rotor Position Estimation for Synchronous Machines Based on Equivalent EMF by Jingbo Liu et al., IEEE Transactions on Industry Applications, Vol. 47, no. 3, May/June 2011, incorporated herein by reference in its entirety. In addition, as shown in FIG. 2, the EMF-based position estimate signal or value $\hat{\theta}_{r\_EMF}$ 42*a* is provided as a preset input to the open loop position generator component 41 for presetting an integrator thereof for transitions from the second mode to the first mode. The conversion components 36 and 39 operate according to a given commutation position signal or value 25*a* $\theta$ provided by the position calculator component 25. As seen in FIG. 2, the position calculator 25 includes another selection component 45 operative when FLAG 49 is 0 to provide the given commutation position signal or value 25*a* as an open loop position signal or value $\theta_{OL}$ 41*a* from the open loop position generator component 41 in the first mode for low-speed operation, or as an estimated position signal or value 42*a* ($\hat{\theta}_{r\_EMF}$) in the second mode when the FLAG 49 is 1 for higher speed operation. The open loop position generator component 41 provides the open loop position signal or value 41*a* from the commanded frequency value 46a and optionally at least partially according to inverter output current signals or values, in this case $i_\alpha$ and 13 reference frame signals or values $i_\alpha$ and $i_\beta$ from a converter component 50, and according to voltage signals $v^*_\alpha$ and $v^*_\beta$ from a converter component 51. The stationary reference frame converter components 50 and 51 convert the current feedback signals 28 and the voltage command (or voltage feedback) signals or values 37 from the a,b,c reference frame to a stationary "α,β" reference frame according to known transformation techniques, and the converters 36 and 39 and the voltage command generator component 23 provide conversion between the a,b,c reference frame and the stationary d,q reference frame according to known transformation techniques.

Figure 7:
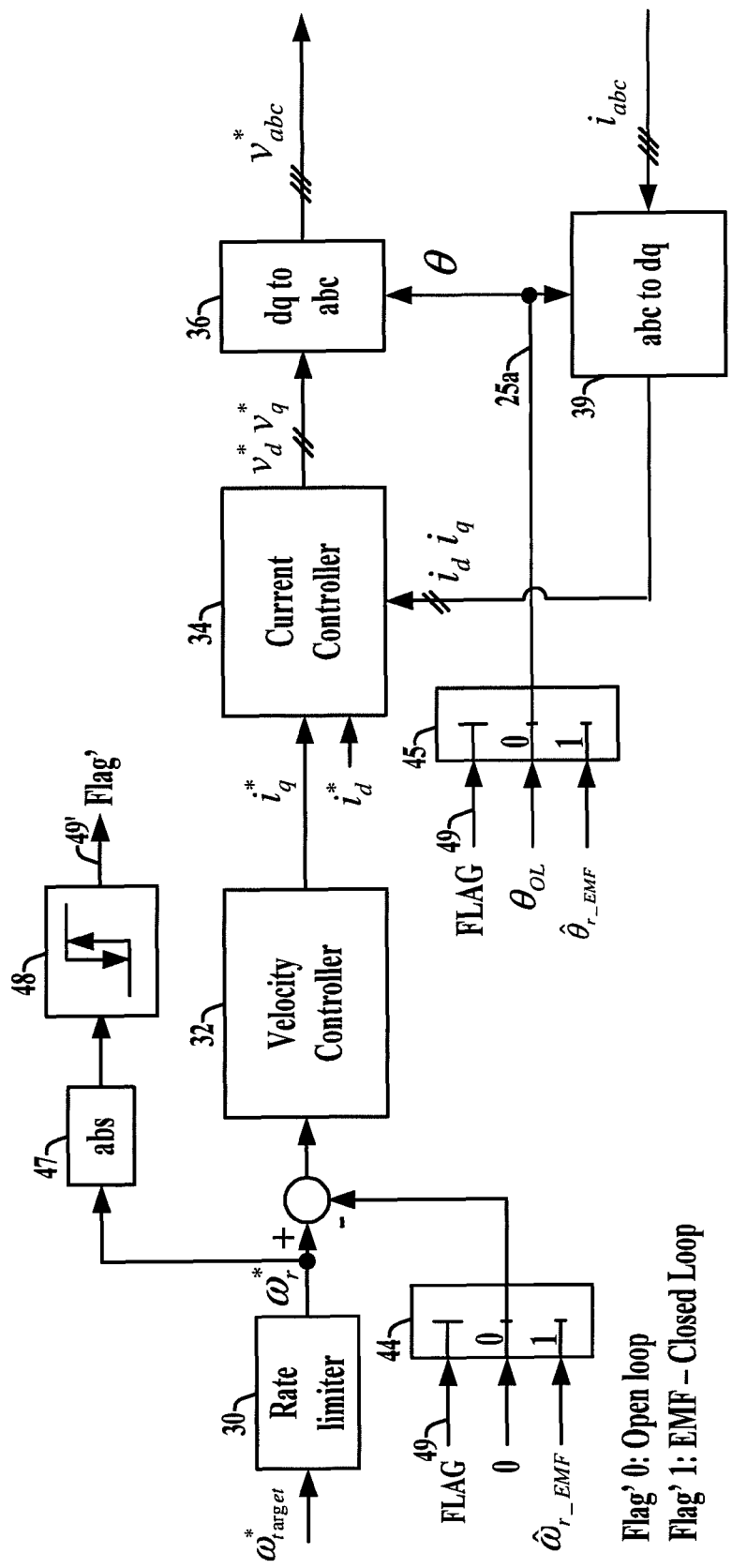
FIG. 7 is a schematic diagram.

FIG. 7 illustrates a first transition embodiment for low-speed to high-speed transition of a position estimate in certain embodiments of the motor drive system of FIGS. 1 and 2, where the selection component 45 changes the commutation position signal or value 25a from the open loop value to the EMF-based closed loop value when FLAG 49 transitions from 0 to 1 as shown in FIG. 5.

Referring now to FIGS. 8A-10, FIGS. 8A and 8B illustrate another process embodiment 150 for speed reversal control of a motor drive, in this case employing selective switching between closed loop operation and open loop operation for controlling the motor load 6 in the first direction prior to transitioning between the jump frequencies 101 and 102. In addition, FIG. 9 illustrates a second embodiment of the flag logic diagram 170 showing a different implementation of the flag logic component 110 to generate the FLAG signal or value 49 (e.g., FIGS. 2 and 4) for selective switching between open loop and closed loop control operation during normal mode operation (RevFlag=0) as well as during reversal control operation (RevFlag=1). FIG. 10 provides graphs 180, 182 and 184 illustrating a reversal control frequency curve 104 the reverse flag RevFlag 108 and a current control curve 106 i* for speed reversal control as a function of time according to the process 150 of FIGS. 8A and 8B. In this embodiment, the controller 20 generates PWM control signals or values 22 at 152 and 155 using closed loop control while the motor 6 is rotating in the first direction at a motor frequency $\hat{\omega}_{r\_EMF}$ having an absolute value $|\hat{\omega}_{r\_EMF}|$ greater than the predetermined threshold frequency $\omega_{TH}$ (with or without hysteresis as discussed above), and then generates the signals or values 22 at 159 using open loop control while the motor 6 continues rotating in the first direction with $|\hat{\omega}_{r\_EMF}|$ less than or equal to $\omega_{TH}$.

Figure 8A:
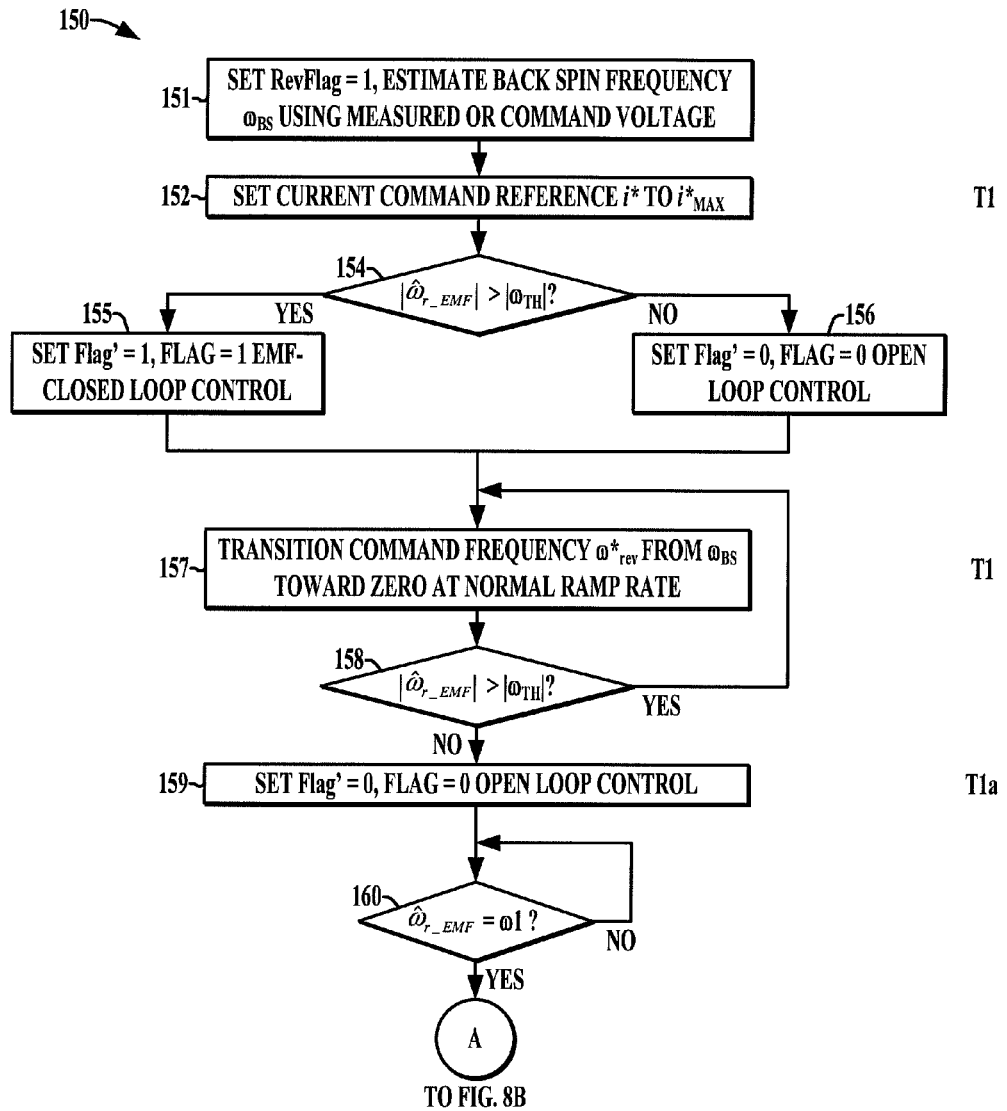
FIGS. 8A and 8B illustrate a flow diagram.
Figure 8B:
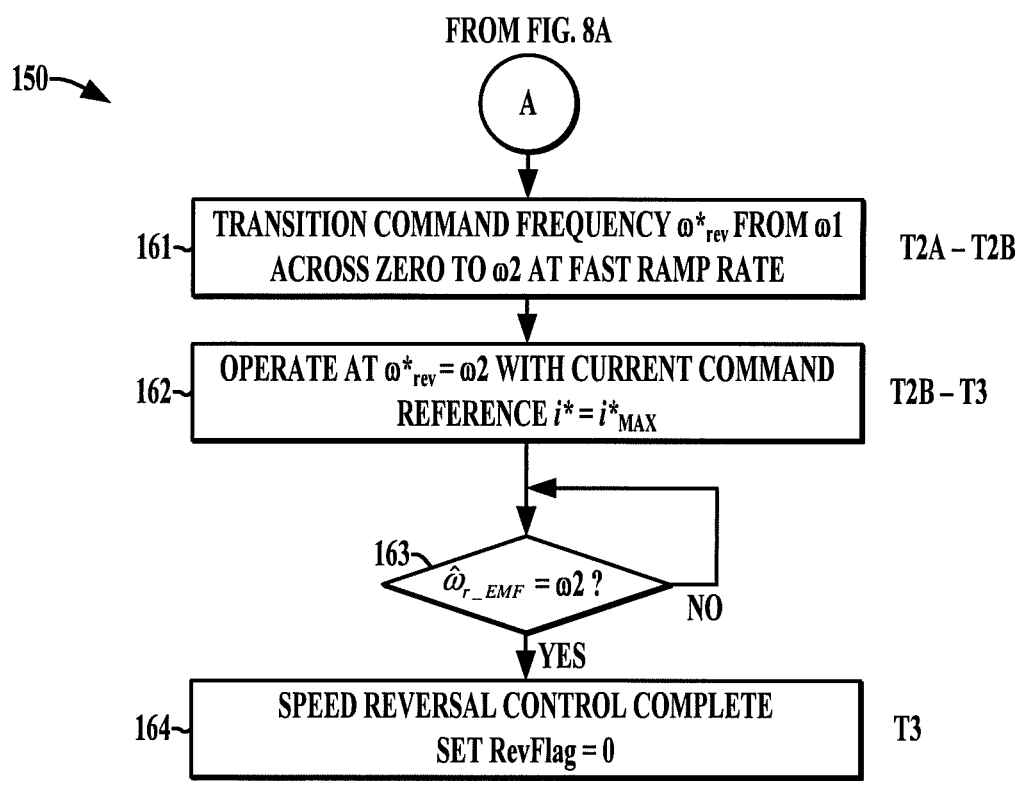

The process 150 begins at 151 in FIG. 8A, with the controller 20 setting RevFlag=1 (curve 108 between T0 and T1 as shown in the graph 182 of FIG. 10), for example, in response to detection of the motor 6 spinning backwards in a first direction at a backspin frequency $\omega_{BS}$ provided or estimated using a measured or command voltage, for example, as described above at 121 in FIG. 3. At 152, the controller 20 sets the current command reference to a high or maximal drive current level (e.g., $i^*_{MAX}$) to maximize system loss and thus dissipate regenerative energy during speed reversal. This is shown in the $\omega_{rev}$ curve 104 of FIG. 10 in the section 104-1 between T0 and T1.

Unlike the process 120 of FIG. 3, however, the controller in FIG. 8A determines at 154 whether the absolute motor frequency value $|\hat{\omega}_{r\_EMF}|$ exceeds the predetermined threshold frequency $\omega_{TH}$. If not (NO at 154), the controller sets Flag'=0 and thus FLAG is set to 0 for open loop control at 156, wherein the flag logic 110 (FIG. 2) is modified according to the logic diagram 170 in FIG. 9 such that the open or closed loop operation is set according to the Flag' signal or value 49' in this embodiment.

If, however, the absolute motor frequency value $|\hat{\omega}_{r\_EMF}|$ is greater than or equal to the predetermined threshold frequency $\omega_{TH}$ (YES at 154), the controller 20 sets the Flag'=1 to set FLAG=1 for EMF-based closed loop control at 155 in FIG. 8A. This is illustrated in the graph 180 of FIG. 10, where the backspin frequency $\omega_{BS}$ at which the motor 6 is initially spinning has an absolute value greater than the threshold $\omega_{TH}$. Accordingly, the drive 10 initially operates using closed loop control at the elevated current command level $i^*_{MAX}$, with the controller 20 transitioning or ramping the command frequency $\omega^*_{rev}$ at 157 in FIG. 8A from the backspin frequency $\omega_{BS}$ toward zero at the normal ramp rate.

At T1a in the graph 180 of FIG. 10, the controller 20 determines at 158 in FIG. 8A that the absolute motor frequency value $|\hat{\omega}_{r\_EMF}|$ no longer exceeds the threshold $\omega_{TH}$ (NO at 158), and accordingly sets the signal or value 49' Flag'=0 (thereby setting FLAG signal or value 49=0) at 159. This switches operation of the voltage command generator 23 and the position calculator 25 into the open loop control mode (e.g., via circuits 44 and 45 in FIG. 2 above), with the ramping operation implemented by generation of the PWM control signals or values 22 continuing in open loop fashion at the first (normal) ramp rate as shown at 104-2 between T1a and T2A in FIG. 10.

As seen at 160 in FIG. 8A, the controller 20 then determines whether the motor frequency value $\hat{\omega}_{r\_EMF}$ has reached the first jump frequency 101 (ω1). When this has occurred (YES at 160), the process 150 continues at 161 in FIG. 8B (at time T2A in FIG. 10), with the controller 20 transitioning the target command frequency $\omega_{rev}$ from the first jump frequency ω1 through zero to the second jump frequency 102 (ω2) at the second faster ramp rate at 104-3 in FIG. 10. At 162 in FIG. 8B, the controller 20 operates the drive inverter 14 at the targeted second jump frequency with $\omega_{rev}$=ω2 while maintaining the elevated command current level $i^*_{MAX}$. This operation continues as shown at 104-4 in FIG. 10, with the controller 20 determining at 163 in FIG. 8B whether the motor operating frequency has reached the second jump frequency (whether $\hat{\omega}_{r\_EMF}$=ω2). Once this condition has been achieved (YES at 163), the controller 20 completes the speed reversal operation (T3 in FIG. 10), and normal operation is resumed by setting RevFlag=0. In the example of FIG. 10, moreover, switching to normal mode operation may result in resumption of the use of the target or setpoint frequency command signal or value $\omega^*_{target}$, in this case, with the controller 20 accordingly ramping the target frequency $\omega^*_{target}$ at the normal (first) ramp rate as shown at 104-5, initially using open loop control from T3 to T3a, and with the hysteresis comparator function 48 changing the Flag' signal or value 49' to "1" at T3a to resume closed loop operation thereafter. As seen in FIG. 10, the target motor frequency eventually reaches $\omega^*_{target}$ at T4, and the controller 20 thereafter continues normal operation at that regulation point as shown at 104-6.

The disclosed motor reversal control concepts thus provide an effective speed reversal scheme for drives with an output filter 16 and a transformer 18 to mitigate and/or prevent uncontrollable rotation of an ESP or other motor in an opposite direction, for example, resulting from fluid backflow in a well pumping situation. The selective use of an elevated current drive value during reversal operation enhances system loss in the drive 10 and thereby helps to dissipate regenerative energy during speed reversal, with the selective use of the first and second jump frequencies 101 and 102 and open loop control during reversal through zero frequency advantageously enhancing controllability of the motor load 6 despite the control difficulties presented by the use of the transformer 18. These concepts thus facilitate the ability to catch or obtain control of an uncontrolled motor spinning in either a forward or reverse direction, and thereafter ramping the drive to a selected speed reference, using low speed, high current control while transitioning through zero in an open loop fashion.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for speed reversal control in a motor drive with an inverter driving a motor through an output filter and a transformer to reverse rotation of the motor from a first direction to an opposite second direction, the method comprising:
generating pulse width modulation control signals to operate the inverter to drive the motor according to a high or maximal drive current command using closed loop control while the motor is rotating in the first direction at a motor frequency having an absolute value greater than a predetermined threshold frequency; and
generating pulse width modulation control signals to operate the inverter to drive the motor using open loop control according to the high or maximal drive current command while the motor is rotating in the first direction at a motor frequency having an absolute value less than or equal to the predetermined threshold frequency to transition the motor speed through zero to reverse rotation of the motor from the first direction to the second direction.

2. The method of claim 1, comprising:
while the motor is rotating in the first direction at a backspin frequency, generating pulse width modulation control signals for operation of the inverter at least partially according to the high or maximal drive current command;
transitioning a motor frequency reversal command at a first ramp rate from the backspin frequency towards zero while generating the pulse width modulation control signals at least partially according to the high or maximal drive current command and at least partially according to the motor frequency reversal command until a motor frequency reaches a first predetermined frequency while the motor continues to rotate in the first direction;
in response to the motor frequency reaching the first predetermined frequency, quickly transitioning the motor frequency reversal command at a second ramp rate from the first predetermined frequency in the first direction to a second predetermined frequency in the opposite second direction while generating the pulse width modulation control signals using open loop control at least partially according to the high or maximal drive current command and at least partially according to the motor frequency reversal command, the second ramp rate being faster than the first ramp rate; and
in response to the motor frequency reaching the second predetermined frequency, resuming normal control to drive the motor in the second direction by generating the pulse width modulation control signals for operation of the inverter at least partially according to a target drive current command and a target motor frequency command.

3. The method of claim 2, comprising determining an operating motor frequency while the motor is rotating in the first direction at least partially according to measured or calculated voltages.

4. The method of claim 3, comprising determining the operating motor frequency while the motor is rotating in the first direction at least partially according to measured voltages at an output of the inverter or measured voltages at an output of the output filter.

5. The method of claim 3, comprising determining the operating motor frequency while the motor is rotating in the first direction at least partially according to command voltages calculated for generating the pulse width modulation control signals.

6. The method of claim 1, comprising determining an operating motor frequency while the motor is rotating in the first direction at least partially according to measured or calculated voltages.

7. The method of claim 6, comprising determining the operating motor frequency while the motor is rotating in the first direction at least partially according to measured voltages at an output of the inverter or measured voltages at an output of the output filter.

8. The method of claim 6, comprising determining the operating motor frequency while the motor is rotating in the first direction at least partially according to command voltages calculated for generating the pulse width modulation control signals.

9. The method of claim 1, comprising:
operating the inverter to drive the motor using closed loop current control according to the high or maximal drive current command and closed loop velocity control while the motor is rotating in the first direction to facilitate dissipation of regenerative energy in the motor drive; and
operating the inverter to drive the motor using closed loop current control according to the high or maximal drive current command and open loop velocity control while transitioning the motor speed through zero to reverse rotation of the motor from the first direction to the second direction.

10. A non-transitory computer readable medium with computer executable instructions for:
generating pulse width modulation control signals to operate an inverter circuit to drive a motor according to a high or maximal drive current command using closed loop control while the motor is rotating in a first direction at a motor frequency having an absolute value greater than a predetermined threshold frequency; and generating pulse width modulation control signals to operate the inverter circuit to drive the motor using open loop control according to the high or maximal drive current command while the motor is rotating in the first direction at a motor frequency having an absolute value less than or equal to the predetermined threshold frequency to transition the motor speed through zero to reverse rotation of the motor from the first direction to an opposite second direction.

11. The non-transitory computer readable medium of claim 10, comprising computer executable instructions for:

determining an operating motor frequency while the motor is rotating in the first direction at least partially according to measured or calculated voltages.

12. The non-transitory computer readable medium of claim 11, comprising computer executable instructions for:

determining the operating motor frequency while the motor is rotating in the first direction at least partially according to measured voltages at an output of the inverter or measured voltages at an output of the output filter.

13. The non-transitory computer readable medium of claim 11, comprising computer executable instructions for:

determining the operating motor frequency while the motor is rotating in the first direction at least partially according to command voltages calculated for generating the pulse width modulation control signals.

14. A power conversion system, comprising:

an inverter comprising a plurality of switching devices operative according to pulse width modulated inverter switching control signals to convert DC power to drive an AC motor load through an output filter and a transformer; and a controller (20) including at least one processor operatively coupled with an electronic memory, the at least one processor programmed to reverse rotation of the motor from a first direction to an opposite second direction by:

generating the pulse width modulated inverter switching control signals to drive the motor at least partially according to a high or maximal drive current command using closed loop control while the motor is rotating in the first direction at a motor frequency having an absolute value greater than a predetermined threshold frequency; and generating the pulse width modulated inverter switching control signals to drive the motor using open loop control according to the high or maximal drive current command while the motor is rotating in the first direction at a motor frequency having an absolute value less than or equal to the predetermined threshold frequency to transition the motor speed through zero to reverse rotation of the motor from the first direction to the second direction.

15. The power conversion system of claim 14, wherein the at least one processor is programmed to:

generate pulse width modulation control signals for operation of the inverter at least partially according to a high or maximal drive current command while the motor is rotating in the first direction at a backspin frequency;

transition a motor frequency reversal command at a first ramp rate from the backspin frequency towards zero while generating the pulse width modulation control signals at least partially according to the high or maximal drive current command and at least partially according to the motor frequency reversal command until a motor frequency reaches a first predetermined frequency while the motor continues to rotate in the first direction;

in response to the motor frequency reaching the first predetermined frequency, quickly transition the motor frequency reversal command at a second ramp rate from the first predetermined frequency in the first direction to a second predetermined frequency in the opposite second direction while generating the pulse width modulation control signals using open loop control at least partially according to the high or maximal drive current command and at least partially according to the motor frequency reversal command, the second ramp rate being faster than the first ramp rate; and in response to the motor frequency reaching the second predetermined frequency, resume normal control to drive the motor in the second direction by generating the pulse width modulation control signals for operation of the inverter at least partially according to a target drive current command and a target motor frequency command.

16. The power conversion system of claim 14, wherein the at least one processor is programmed to:

determine an operating motor frequency while the motor is rotating in the first direction at least partially according to measured or calculated voltages.

17. The power conversion system of claim 16, wherein the at least one processor is programmed to:

determine the operating motor frequency while the motor is rotating in the first direction at least partially according to measured voltages at an output of the inverter or measured voltages at an output of the output filter.

18. The power conversion system of claim 16, wherein the at least one processor is programmed to:

determine the operating motor frequency while the motor is rotating in the first direction at least partially according to command voltages calculated for generating the pulse width modulation control signals.

* * * * *